UNITED STATES PATENT OFFICE.

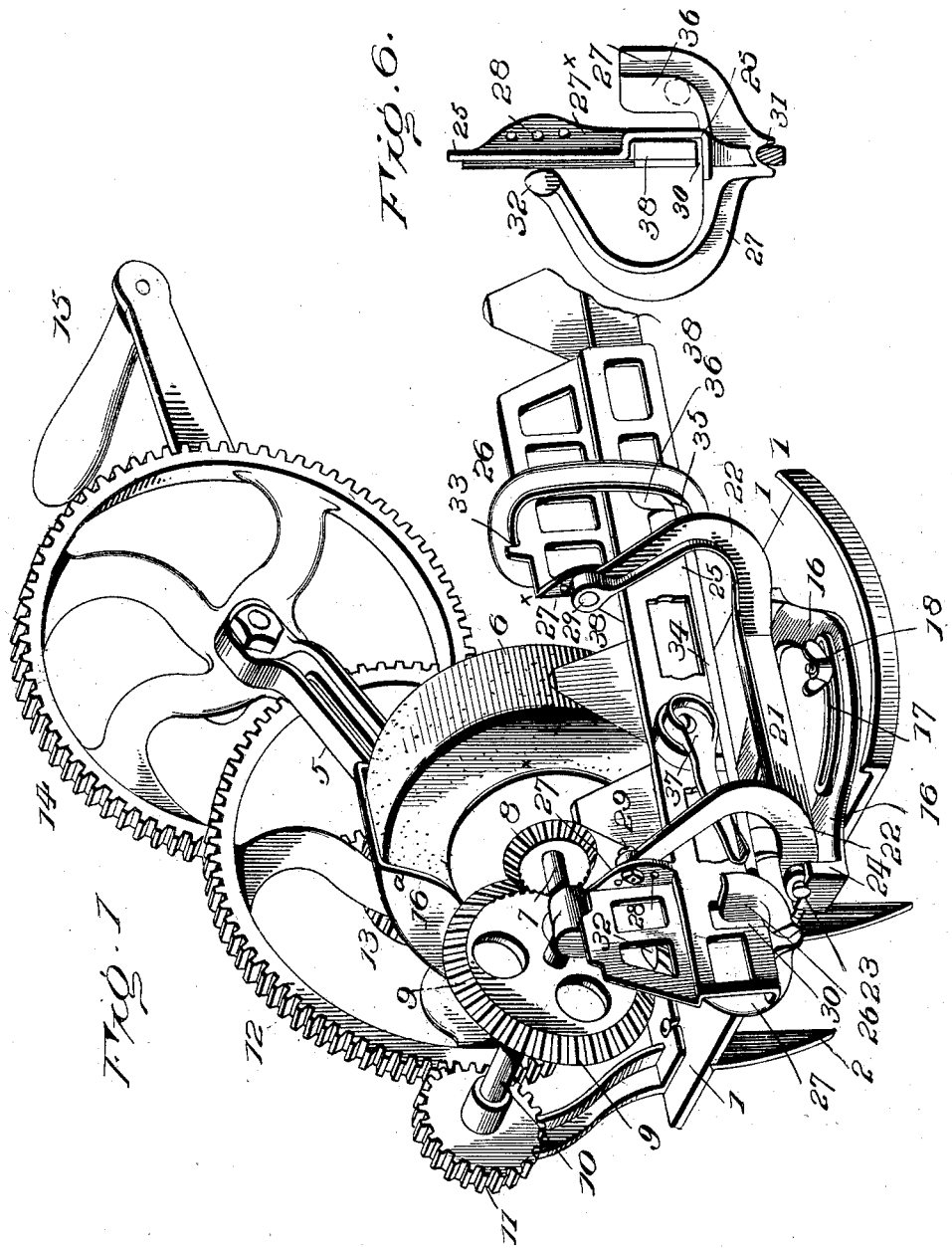

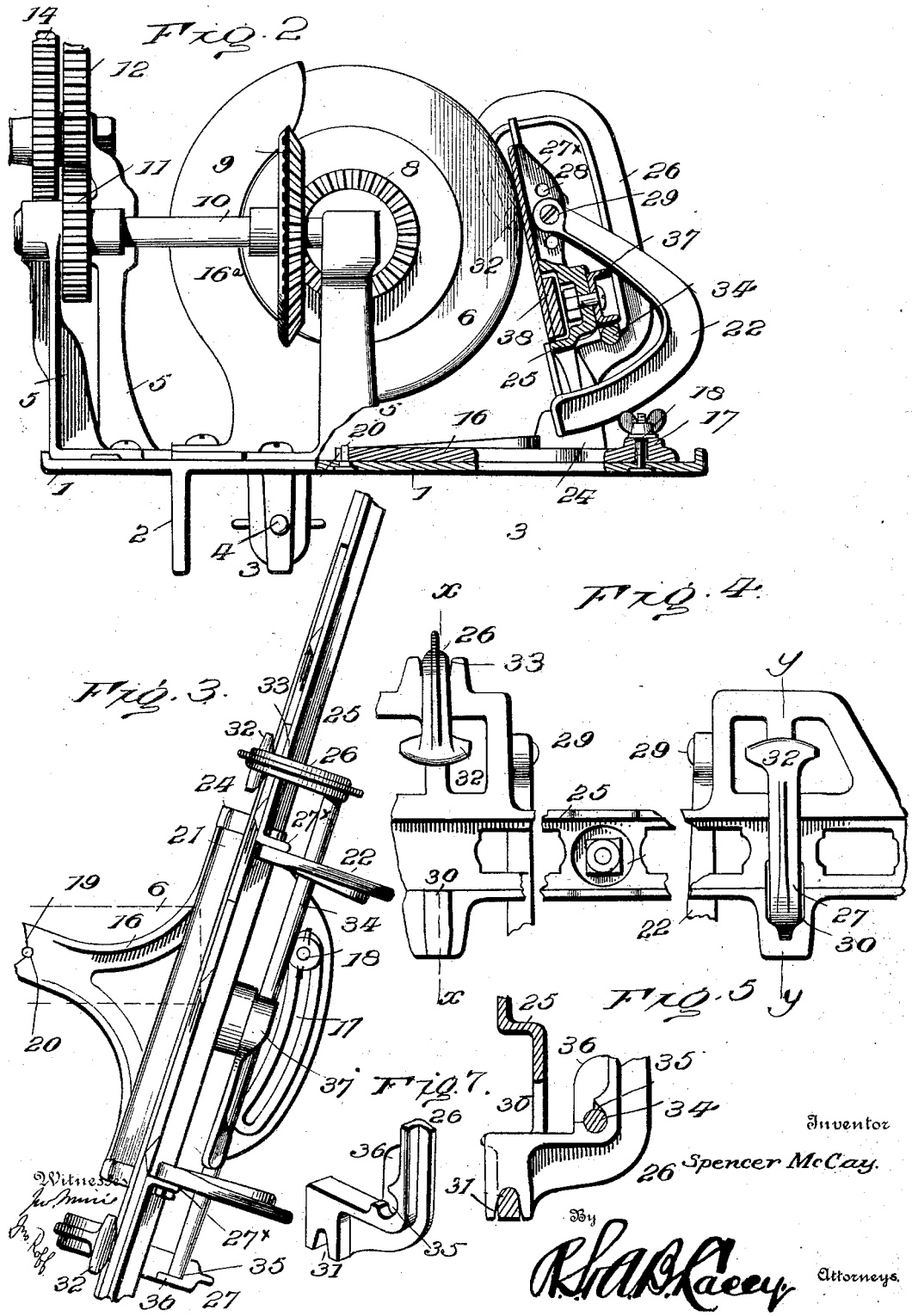

SPENCER McCAY, OF TOPEKA, KANSAS.

SHARPENER FOR MOWER OR REAPER KNIVES.

SPECIFICATION forming part of Letters Patent No. 707,616, dated August 26, 1902.

Application filed January 10, 1902. Serial No. 89,192. (No model.)

*To all whom it may concern:*

Be it known that I, SPENCER MCCAY, a citizen of the United States, residing at Topeka, in the county of Shawnee and State of Kansas, have invented certain new and useful Improvements in Sharpeners for Mower or Reaper Knives; and I do hereby declare the following to be a full, clear, and exact description of the invention, such as will enable others skilled in the art to which it appertains to make and use the same.

In its special adaptation the machine is particularly designed for sharpening the cutting apparatus of agricultural machinery, such as mowers and reapers, although capable of universal application for grinding knives, blades, tools, and implements of any nature.

In its organization the machine comprises a rotary grinder, actuating mechanism therefor, a work-holder, and mountings therefor to admit of angular adjustment of the work, essential when sharpening mower-knives, and an oscillation of the work to bring every part of the edge to be ground into position for contact with the rotary grinding-wheel.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a machine embodying the invention. Fig. 2 is a side view, the base and work-holder being in section. Fig. 3 is a top view of the work-holder. Fig. 4 is an elevation of the work-holder as seen from the inner side. Fig. 5 is a detail view of the clamp about on the line X X of Fig. 4 looking to the left, the upper portion being broken away. Fig. 6 is a detail section of the clamp about on the line Y Y of Fig. 4 looking to the right. Fig. 7 is a detail perspective view of the lower end portion of one of the jaws.

Corresponding and like parts are referred to in the following description and indicated in all the views of the drawings by the same reference characters.

The bed-plate 1, supporting the working parts, is provided with a clamp for attachment of the machine to a suitable support, which may be the rim of the drive-wheel of a mower or reaper, a part of the frame of a wagon-body or agricultural implement, or a support of any nature. The clamp comprises jaws 2 and 3, the jaw 3 being movable by means of a clamp-screw 4 or other means. Standards 5 project upward from the bed-plate 1 and support the shafts of the rotating parts. The rotary grinder 6 is secured to a shaft 7 and is provided with a bevel-pinion 8, in mesh with a bevel gear-wheel 9, secured to a shaft 10, arranged at a right angle to the shaft 7 and carrying a pinion 11, which is in mesh with a gear-wheel 12, provided at one side with a pinion 13, in mesh with a gear-wheel 14, constituting the driver and which in the present instance is provided with a crank-handle 15 for manual operation. Any form of gearing may be substituted for the train of gearing illustrated without departing from the nature of the invention, so long as the grinder 6 is driven to a high rate of speed when the machine is in operation. A guard 16$^a$, secured at its lower end to the bed-plate 1, protects the rear portion of the grinder 6 and prevents particles of metal and abrasive material reaching the gearing. Within the purview of the invention the rotary grinder 6 and its actuating mechanism may be of any type and form of construction.

The work-holder comprises a base 16, a swinging frame, and an oscillatory clamp. The base 16 has one end contracted to form a stem and its opposite end widened and provided with an arcuate slot 17, through which passes a bolt or fastening 18 for clamping the base to the bed 1 in an adjusted position. The inner end of the base forms a stem, and the extremity is notched, as shown at 19, to receive a pin 20, projected vertically from the bed 1 and constituting a center about which the base 16 turns when adjusting the work-holder to properly position the blade with reference to the grinder, so as to secure the desired bevel. The slot 17 is formed on the arc of a circle struck from the pin 20 as a center and is of a length to admit of the work-holder being swung from side to side to admit of properly grinding opposite edges of a tooth. When the fastening or clamp-screw 18 is loosened, the base 16 can be moved and when shifted to the desired position is made secure by retightening the fastening 18. The swinging frame comprises a bar 21 and curved arms 22, extending upward in parallel relation. The bar 21 forms a tie and connects the lower ends of the curved arms 22, and its terminal portions are extended to form journals 23, which obtain bearing in lugs 24 of the base 16. This swinging frame coöperates with the oscillatory clamp to admit of every part of a tooth or blade being brought into contact with the grinder. The clamp comprises a frame or plate 25 and jaws 26 and 27 and has pivotal connection with the swinging frame, so as to rock or oscillate, whereby every part of the edge of a tooth or blade to be sharpened is brought in position to be acted upon by the grinder. The frame of plate 25 has its upper portion cut away at a point about midway the ends of the clamp, so as to admit of the work being presented to the grinder without interference, as shown most clearly in Fig. 1. The end portions bordering upon the space are flanged, as shown at 27×, and a vertical series of openings 28 is provided in each flange to admit of adjustably connecting the clamp with the swinging frame, the upper end of the curved arms 22 being pivotally connected with the said flanges by pivot-fastenings 29, passing through openings in the upper ends of the arms 22 and through one of the series of openings 28 of the flanges 27×. This construction admits of vertical adjustment of the clamp, so as to bring the work into any desired position within certain limits. Slots 30 are provided at the lower portion of the plate or frame 25 and receive the lower ends of the jaws 26 and 27. So far as the operation of the clamp is involved the jaws may be similar in construction, and each may have its gripping portion curved either to extend over the plate, as shown at 26, or beneath the plate, as shown at 27. In either form of construction the jaws are similarly mounted with reference to the plate or frame 25, and their lower ends pass through slots 30 and are notched, as shown at 31, to embrace the lower end portion of the said slots, as shown most clearly in Fig. 5. The gripping ends 32 of the jaws 26 and 27 coöperate with end portions of the plate or frame 25, and the work is clamped between these parts. The jaw 26 has its upper portion curved over the upper edge of the part 25 and fitted in a notch 33, whereas the jaw 27 extends around the lower edge of the part 25 and up in front thereof. The two jaws 26 and 27 are connected for simultaneous actuation by means of a rod or bar 34, which has loose connection with each, so as to admit of the jaws adapting themselves to any variation in thickness of the work to be clamped. As shown, the end portions of the tie 34 are seated in notches 35, formed in the inner sides of the jaws, at the elbow between the horizontal and vertical portions thereof. These seats 35 are closed at their outer sides by ears 36, which also serve to reinforce and strengthen the jaws at the elbow. The tie rod or bar 34 is located a distance from a plane passing vertically through the pivotal connection of the jaws with the part 25. Hence downward pressure on said tie causes the jaws to turn and their gripping ends to advance toward the plate 25, so as to grip the work placed in position between the parts 32 and 25. This tie rod or bar 34 is resilient, so as to yield slightly and exert a spring action sufficient to firmly grip the work and hold the cam-lever 37 when moved to the limit of its throw to effect a gripping of the work. The cam-lever 37 has pivotal connection with the plate or frame 25 at a point about midway between the jaws 26 and 27, and its cam portion is adapted to exert a downward pressure upon the spring tie rod or bar 34.

The mower or reaper blade to be sharpened is clamped between the jaws and the plate or frame of the oscillatory portion of the work-holder, and the latter is swung either to the right or to the left, according as the right-hand edge or the left-hand edge of a tooth is to be sharpened. The work-holder being adjusted so as to properly present the edge of the blade to the grinder, the operation of the grinder is as follows: Motion is imparted to the grinder 6 either by means of the crank-handle 15 or other motive power, so as to drive the grinder at a high rate of speed, after which the blade is presented by swinging the frame and oscillating the clamp, the combined movements of the frame and clamp resulting in bringing every portion of the edge of the blade in position to be sharpened by contact with the rotary grinder. In this connection it may be well to observe that the face of the grinder must be of sufficient width with reference to the length of the blade or tooth to insure contact of every portion of the edge to be sharpened with the grinder when the work is rocked or oscillated during the process of sharpening.

Having thus described the invention, what is claimed as new is—

1. In a machine of the character specified, a base having lugs, a swinging frame comprising arms and a connecting tie-bar, the latter having extensions forming journals mounted in the aforesaid lugs, and a clamp carried by the swinging frame, substantially as set forth.

2. In a machine of the character described, a clamp for the work comprising a frame, spaced jaws coöperating with the frame, and means for simultaneously operating both jaws to effect a gripping of the work, substantially as set forth.

3. In a machine of the character described, a clamp for the work comprising a frame, spaced jaws coöperating with the frame, a tie connecting the jaws, and means for applying force to the said tie to effect a simultaneous operation of the jaws, substantially as set forth.

4. In a machine of the type specified, a clamp for the work comprising a frame, spaced jaws coöperating with the frame for gripping the work, a spring-tie connected to the jaws for simultaneous operation, and means for applying pressure to the spring-tie, substantially as and for the purposes set forth.

5. In a machine of the character described, a clamp for the work comprising a frame, spaced jaws, a tie having loose connection with each of the jaws to effect simultaneous movement thereof and permit each to adapt itself to any variation in thickness of the work to be clamped, and means for applying pressure to the said tie, substantially as set forth.

6. In a machine of the character described, a clamp comprising a frame, spaced jaws cooperating with the frame, a rod or bar having its ends seated in notches or depressions of the said jaws, and means for applying force to the said tie to effect simultaneous actuation of the jaws, substantially as set forth.

7. In a clamp, a frame, spaced jaws having pivotal connection with the frame and comprising elbow-shaped portions and having seats in the elbows closed at their outer ends by reinforcing-plates, a tie rod or bar having its ends fitted in said seats, and means for applying pressure to the said tie to effect simultaneous movement of the jaws, substantially as set forth.

8. In a clamp, a frame having slots, spaced jaws having a portion passed through the said slots and notched to make pivotal connection therewith, a tie rod or bar connecting the jaws, and means for applying pressure to said tie, substantially as specified.

9. In a clamp, a frame, spaced jaws pivotally mounted upon the frame, a tie rod or bar connecting said jaws, and a cam-lever pivotally attached to the frame and adapted to exert a pressure upon the tie-rod intermediate of its ends, substantially as set forth.

10. In a grinding-machine, and in combination with the bed provided with a rotary grinder, a base mounted upon the bed for angular adjustment, means for securing the base in the required position, a swinging frame mounted upon the base, and a clamp having adjustable pivotal connection with the swinging frame and having its upper portion cut away intermediate of its ends, substantially as and for the purpose set forth.

In testimony whereof I affix my signature in presence of two witnesses.

SPENCER McCAY. [L. S.]

Witnesses:
GLADYS L. THOMPSON,
GENEVIEVE MATTHEWS.